3,730,845
INSTALLATION FOR PRODUCING MALT
Rolf Schultz, Duisburg, Germany, assignor to Rheinstahl Wanheim Gesellschaft mit beschrankter Haftung, Duisburg-Wanheim, Germany
Filed Apr. 15, 1969, Ser. No. 816,282
Claims priority, application Austria, Apr. 16, 1968, A 3,687/68
Int. Cl. A23l *1/46;* C12c *1/00*
U.S. Cl. 195—129                                8 Claims

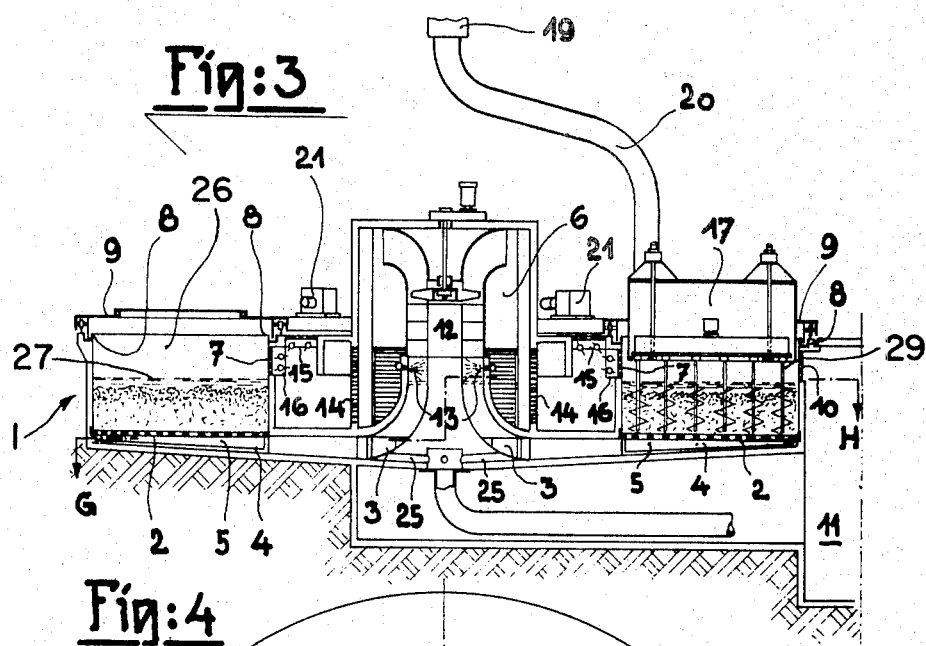
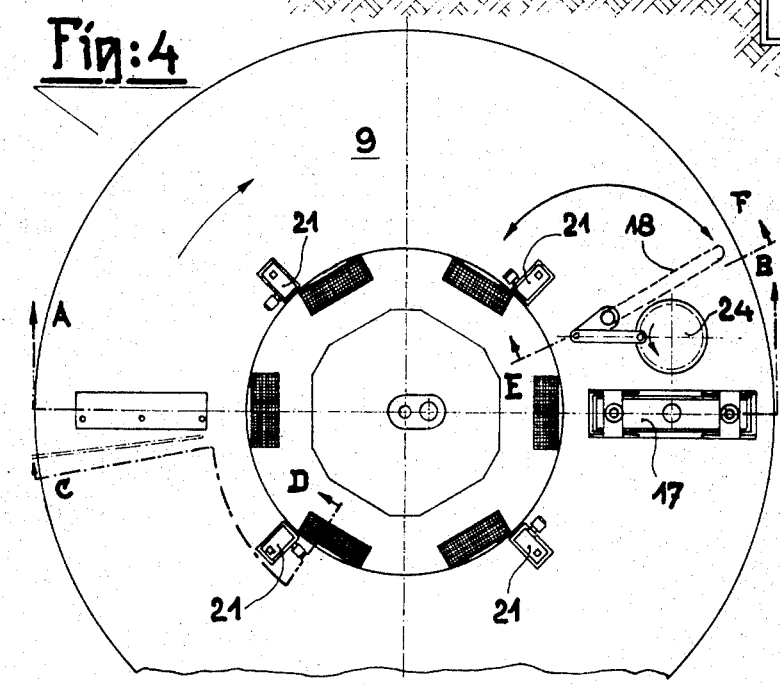

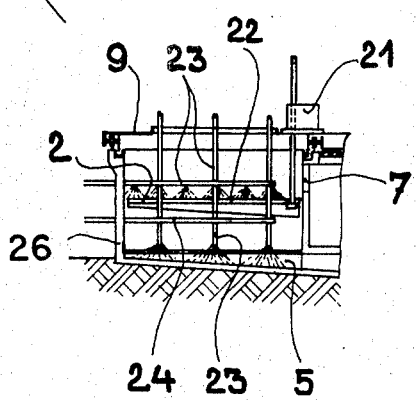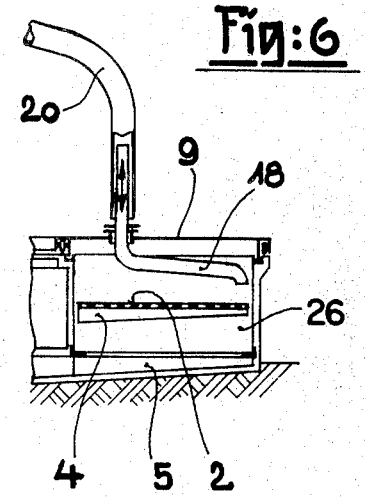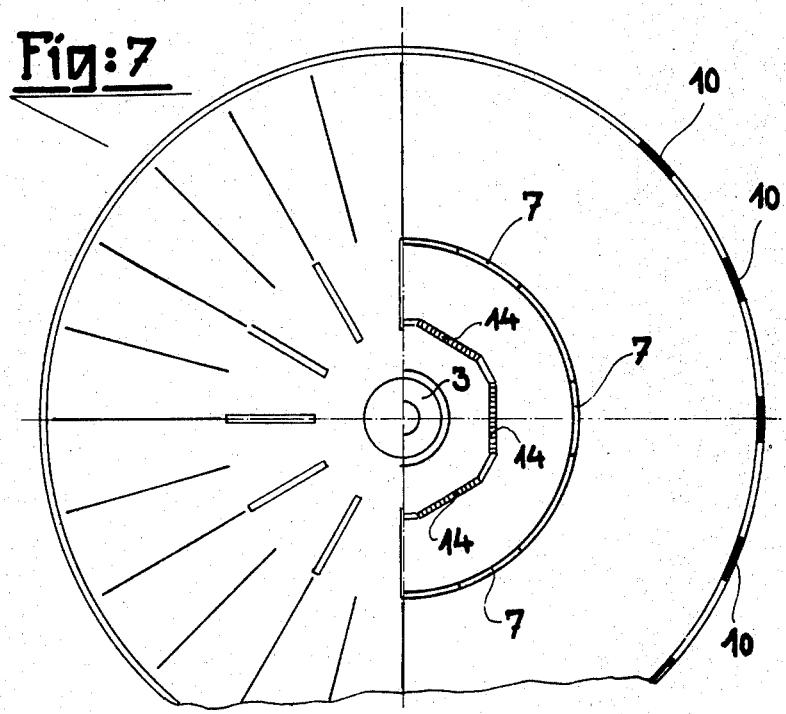

ABSTRACT OF THE DISCLOSURE

An installation for producing green or cured malt having a closed annular chamber, an annular conduit below the floor of the chamber and sloping radially inwardly and downward to form an annular pipe which extends upward through the center of the annular chamber to an air conditioning unit which is connected back to the chamber above a predetermined level for the steeping water.

---

Figure 1:
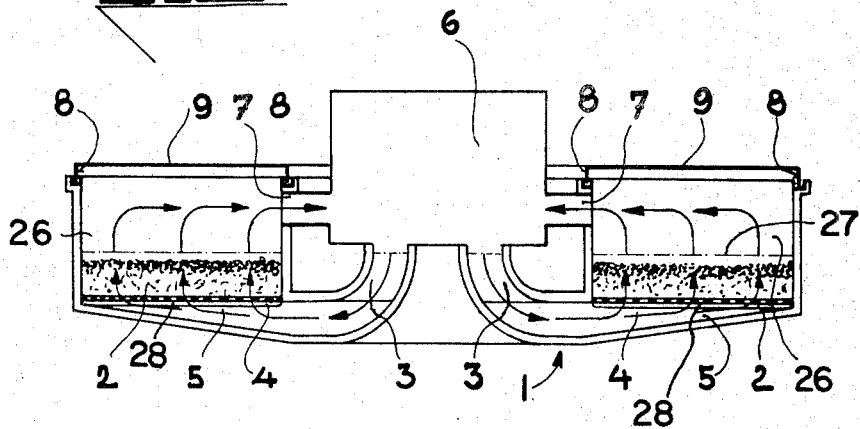

This invention relates to an installation for producing malt by steeping and germinating, and preferably by steeping and curing in a closed box or chamber, in which the grain can be both germinated and cured as well as steeped by conventional and modern methods.

With the modern malting processes, and especially the resteeping process, good-quality malt can be produced with high quantitative yield within a production period of 6 days. In the resteeping process, the sparingly steeped material is again covered with water after an initial germinating phase of 2–3 days, in order to achieve a high degree of steeping. The anaerobic respiration during resteeping inhibits any further radical growth during the subsequent dissolving phase lasting for 2–3 days. During the latter phase, the very moist malting material is uniformly dried, preferably with the aid of unmoistened, cold air, firstly to prevent an excessive growth of the plumule, and secondly to fix homogeneously the rapidly progressing dissolution of the malt in a drying phase as short as possible. To this end, the malting material is repeatedly placed under water during the short production period and treated with varying quantities of air of different temperature and humidity.

In order to operate a malting unit at full capacity, it is expedient to process the malting material in several production stages. On the other hand, if the production capacity is to be increased by stages, it is more advantageous to install one box at a time, in which the malting material can be steeped, germinated and cured.

Boxes having the conventional rectangular base surface have already been constructed or proposed for the steeping, germinating and curing of the material and are, therefore, known in the art.

A substantial disadvantage of such known boxes is constituted by the great consumption of water in the resteeping process owing to the dead-water space under the kiln floor. A box of this kind has a much greater length than width and, for the purposes of saving space and a more efficient arrangement of the malt-conveying devices, is placed with its long side adjacent to other boxes. Consequently, an air-conditioning unit effecting the aeration can be mounted only on one of the front faces of the box. With this arrangement, there is a short air path to the kiln at the front face of the box on the side of the aerating unit, and a much longer air path to the kiln at the opposite front face. Moreover, the conveying of air in the direction of the longitudnial axis of the box is also unfavourable owing to the ribs of the kiln floor bracing arranged over the shorter span, i.e. at right angles to the air stream. This leads to an irregular aeration of the malting material, unless the speed of the air flow in the space under the kiln floor is kept small to avoid dynamic pressure differences and losses due to friction. However, a low air-flow velocity can only be achieved by providing a large flow cross-section, i.e. a large dead-water space.

With the usual loadings and air quantities, the resistance of the malt beds in the germinating phase is 3–5 mm. water column, and in the curing phase 50–80 mm. water column. If, for the purpose of reducing the size of the dead water space, the velocities usually employed in air-conditioning technology for air ducts of up to 20 m./sec., corresponding to a dynamic pressure of up to 30 mm. water column are applied to the space under the kiln floor as well, then the design of the space under the kiln and of the air connection must be such that it ensures an undisturbed air velocity, constant over the length of the box, because otherwise the aeration of the malting bed will be irregular owing dynamic pressure differences and frictional losses. During the subsequent installation of conventional germinating boxes in the very low spaces available, it is often necessary to apply high air velocities under the kiln floor. In order to minimize the dynamic pressure differences, the distance between the bottom of the box and the kiln floor is progressively reduced away from the air connection in accordance with the diminishing quantity of air. The constructors of malting installations are obviously familiar with the correct flow-technological design of the air spaces to achieve a uniform aeration of beds, convectors and the like. However, with the known rectangular boxes this knowledge could not lead to satisfactory results, because a favourable conveying of air is not possible owing to the ribs of the kiln floor bracing in case of front-side air intakes, while in the case of air intakes arranged on the long side the feed has to be effected from a conditioning unit located on the front side. The situation is further aggravated by the fact that in order to prevent the penetration of water during steeping the horizontal air ducts have to be extended upwards above the level of the steeping water in order to dispense with expensive hermetically sealing elements such as slide valves or the like. Since a sharp change in the orientation of the air duct from the horizontal into the vertical direction would disturb the flow profile, the ducts must be constructed with a large radius of curvature. This further increases the space requirements in the case of air inlets arranged on the long side. In order to avoid the disadvantages of the rectangular box apparent during steeping, constructions have been proposed in which, in order to reduce the dead-water space during steeping, the bottom of the boxes is lifted with sealing effect or the kiln floor is lowered. These constructions are of course expensive and susceptible to breakdowns.

A further disadvantage of the rectangular boxes is that they are open at the top, necessitated by the arrangement and mode of functioning of the malt oar and reamer. The box must therefore be seated in a closed, insulated space, so that the oar and the reamer are exposed to the humid atmosphere of the box together with their electrical installations. With boxes designed to effect the curing as well, the mechanical installation must additionally be able to withstand the effects of dust and of high temperatures. The large box volume both below the kiln floor and above the malting material is also disadvantageous with regard to the use of a carbon-dioxide containing flooring air, because it is impossible to achieve high and uniform $CO_2$-content within the flooring air.

It is desirable to reduce at least one of these drawbacks of malting in rectangular boxes.

The present invention includes an installation for producing green or cured malt comprising a chamber having supply means for supplying the granular material, means for turning the material, means for supplying conditioned air to the chamber, means for the introduction and discharge of the steeping water, the chamber being annular or circular and there being provided conduit means in connection with the underside of the floor of the chamber and arranged to form with the chamber a syphon extending above a predetermined level for the steeping-water, and radial ribs provided underneath the floor of the chamber to assist in forming the annular air duct forming part of the conduit means.

It is to be noted in this connection, that circular kilns in tower-malting installations are already known, see for example the German patent specification No. 9,262, dated April 1, 1870, FIGS. 4–7, and the German patent specification No. 17,932, dated 1882, both of which are incorporated by reference. Further, boxes displaceable along a circular path have already been described in connection with the so-called Saturn malting process, in e.g. "Baruwelt," 1962, pp. 1124–1125.

However, none of these previously known installations allows a steeping or resteeping of the malting material in the boxes. For this reason alone, these installations belong to a class different from that of the installation according to the present invention, even though they comprise some elements also present in the installation according to the present invention. In any case, the known installations cannot carry out the task of the installation according to the present invention, owing to different and/or differently arranged structural elements. More specifically, they cannot steep the malting material in the same box without transfer, more especially immersing it at any required time in water, and to strip it with air or gas in the intervals.

In order to achieve a uniform aeration of the material with a small dead-water space, there is provided a radial air duct extending from the external to the internal box wall through the inwardly-sloping box bottom, widening proportionally to the kiln surface supplied, the latter surface being considered as a boundary from the external box wall inwards. To avoid irregularities in the aeration of the various kiln-floor sections with small flow cross-sections, the invention provides for the bracing of the kiln floor with radial ribs. The air duct transforms without cross-sectional variations in its radial outlet into a circular pipe, whose axial outlet is extended above the level of the steeping water. For the same purpose, the air duct is connected to the delivery or intake end of a centrally arranged air-conditioning unit, which is connected in turn on the intake or the delivery end to the interior of the box space through apertures arranged above the steeping-water level in the inner box wall.

Further features of the object of the invention will be apparent from the claims, the specification and the drawings.

Figure 2:
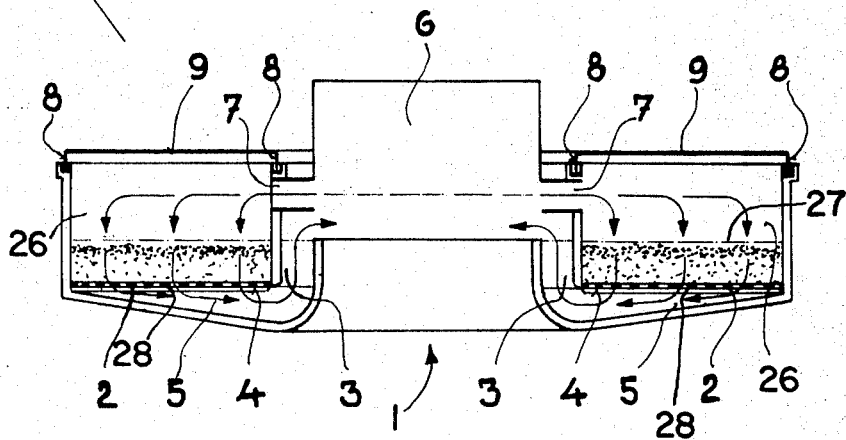

The drawing shows two forms of the preferred embodiment, in particular in FIG. 1 diagrammatically a box for delivery- or pressure-side connection of the air space underneath the kiln floor, in FIG. 2 a diagram of a box for suction-side connection of the air space underneath the kiln floor, in FIG. 3 a cross-sectional view of a further installation modified in its details, in FIG. 4 a top view of the installation of FIG. 3, in FIG. 5 a section taken along the line C–D of FIG. 4, in FIG. 6 a section taken along the line E–F of FIG. 4, and in FIG. 7 a section taken along the line G–H in FIG. 3.

The space underneath the circular kiln floor 2 is constructed in FIG. 1 as an annular air duct 5 oriented towards the centre of the box 1, so that the length of the air paths between the centrally arranged air-conditioning unit 6 and the kiln floor 2 differs only by the width of the kiln floor. Openings 28 are provided in the floor 2 to allow air and water to pass through.

The kiln floor 2 is braced with radially arranged ribs 4, which do not hinder the flow of air. The distance between the bottom of the box 1 and the kiln floor 2 is very small, in order to minimize the dead-water space. In order to avoid pressure differences resulting from the consequent high air velocities beneath the kiln floor 2, the space under the kiln floor 2 is constructed for constant air velocity, by varying the distance between the bottom of the box 1 and the kiln floor 2 proportionally to the distance from the axis.

For the purpose of uniform flow, the annular air duct 5 transforms without variation in width into the radial outlet of radially extending curved annular pipe 3, whose axial inlet extends above the steeping-water level indicated for illustrative purposes, in phantom at 27, and is connected to the centrally arranged air-conditioning unit 6. The central symmetry of the box 1 and of the air-conditioning unit 6 as well as the undisturbed air-flow profile over the whole of the box circumference make possible a uniform distribution of the air over the kiln floor surface at high air velocities, and a small dead-water space which cannot be achieved with the previously known boxes.

The box according to FIG. 1 allows the usual upward conduction of air, but also the conduction of air from top to bottom, since it is closed hermetically by means of a lid 9 which, thereby forms an annular or circular chamber 26. With descending aeration, i.e. downward-streaming air underneath the kiln floor 2 as shown in FIG. 2, the connection of the annular pipe 3 is less critical, since a disturbance of the flow profile e.g. in a pipe of small radius directly behind the inner box wall, does not influence the flow profile in the annular air duct 5. The dead-water space, which also includes the space of annular pipe 3 as far as the steeping-water level 27, can be kept smaller in the case of suction-side connection of the annular air duct 5 than in the case of delivery-side connection. This advantage of descending aeration, however, is accompanied in the case of boxes in which curing is also effected by the drawback that the material is appreciably compressed during curing. The suction-side connection of the annular air duct 5 is therefore advantageous for boxes designed only for germination and steeping.

A further example of embodiment will now be described with reference to FIGS. 3 to 7 for the steeping, germination and curing with aeration of the malting material in upward direction.

The lid 9 rests with wheels on circular rails and can be rotated about the centre of the box 1 by means of a drive here not shown. To effect the constant air-tight sealing of box 1 by means of water-tray seals 8, unless ring webs engage on the underside of lid 9 into corresponding water-filled channels on the inner and outer box wall. The small enclosed air volume makes possible high and uniform carbon dioxide concentrations during circulating operation. Another substantial advantage is the possibility of installing the various devices for feeding, turning and evacuation in the lid with sealing effect, while the sensitive parts of these devices, such as drives and electrical fittings are arranged outside the box atmosphere.

Above the malting material, the box 1 is connected by means of air outlets 10 in the outer box wall with an air exhaust duct 11, and communicates through apertures 7 in the inner box wall and adjustable air valves 16 with the centrally arranged air-conditioning unit 6.

The space, in which the air-conditioning installations are concentrically accommodated, is essentially defined by the inner box wall, the curved annular pipe 3 and an upwardly enclosing housing, in which fresh air valves 15 adjustable via the return air valves 16 are arranged. The fresh air valves 15 enable the return air to be mixed with fresh air in any proportions. The mixed air is drawn in through concentrically arranged convectors 14 for cooling or heating the air by a centrally arranged, adjustable axial fan 12. However, instead of the axial fan 12 and the convectors 14 other known devices effecting ventilation and cooling or heating of the air can be arranged between the return air valves 16 and the axial outlet of annular pipe 3.

The axial fan 12 is arranged above the steeping-water level 27 and feeds on the delivery side directly into the axial intake of the annular pipe 3, which is equipped with humidifier nozzles 13. The radius of the curvature of the annular pipe 3 substantially corresponds to the steeping-water level 27 and the radial outlet of annular pipe 3 transforms without variation into the annular air duct 5. By this arrangement, with delivery-side connection of the annular air duct 5, an optimum aeration of the kiln floor 2 will be achieved, with a dead-water space only slightly greater than in the case of suction-side connection. Water channels 25 sloping inwards from the lowest point of the annular pipe 3 in radial direction connect the box 1 with the conduit connecting centrally from below for the introduction and evacuation of the steeping water.

The lid 9 has an oar 17 fitted thereinto with sealing effect. The oar 17 has means 29 depending downwardly into the material for turning the same and can be raised for the curing and evacuation of the malt, in order to avoid crushing the dry radicals through the kiln floor 2. For the same reason, the cured malt is not evacuated mechanically, but by means of a pneumatic conveyor unit here not illustrated, with the aid of a suction trunk 18 swingable over the whole width of the box 1 (FIGS. 4 and 6). The trunk 18 is passed rotatably and with sealing effect through the lid 9; it can be vertically raised by means of a not illustrated lifting device and can be made to traverse over the whole width of the box by means of a drive, e.g. an eccentric drive 24. The suction trunk 18 is connected via a conduit 20 with a rotatable coupling 19 arranged over the centre of the box. From coupling 19 a not illustrated conduit leads to the pneumatic conveyor unit which can also serve for introducing the malting material into the box 1 by switching it to compressed air feed.

However, in addition to the described manner, the malting material can also be introduced simply by gravity feed, either dry or with water, in uniform distribution through the coupling 19 and can be evacuated through a manhole arranged in the bottom of the box by means of a scraper arranged for lowering movement underneath the lid 9. In the case of a box 1, designed only for steeping and germinating the malting material, this arrangement for the introduction and evacuation of the material would be less expensive than the pneumatic system. The aforedescribed arrangements can also be advantageously applied to a box 1 designed solely for curing, since in the known malt kilns with rectangular plane floors a considerable amount of manual work is required to effect uniform loading. The annular box 1 can also be constructed with automatic cleaning facilities. To this end, the inner rim of lid 9 will be provided with several equally spaced winches 21, and the kiln floor 2 provided with a cleaning aperture 22 is integrally constructed. The evacuated kiln floor 2 can be raised by means of the winches 21 and rotated with the lid 9, so that, by means of pressurized water jets 23 introduced radially through the external box wall above and below the raised kiln floor 2 the floor can be cleaned, as can be the box lid by means of water jets 23 introduced through the lid 9 and the cleaning aperture 22.

I claim:

1. An installation for producing green or cured malt comprising a closed annular chamber having a floor, said floor having openings to allow water and air to pass through; supply means for supplying granular material into said chamber; means for turning the material within said chamber; means for supplying conditioned air to said chamber, said supplying means having a delivery end and an intake end; means for the introduction to and discharge from said chamber of steeping water; conduit means including an annular air duct beneath said floor which transforms without variation in width into an annular pipe with one end thereof extending above a predetermined level for the steeping water, said pipe being connected to one of said ends; means for returning said air to said supplying means, said returning means being connected to the other of said ends; and radial ribs provided underneath the floor of the chamber extending into said annular air duct to brace said floor; said annular air duct having a radially inwardly sloping bottom such that said annular air duct deepens continuously inwardly at a rate proportional to the floor area supplied by said air duct.

2. An installation according to claim 1, wherein the annular air duct transforms without variation in the width into a radially extending annular pipe forming part of the conduit means and wherein the means for introduction and discharge of steeping water comprises inward-sloping water channels, the axial outlet of the annular pipe extending above the predetermined steeping-water level.

3. An installation according to claim 1, wherein said means for returning said air includes apertures arranged in the inner wall of the annular chamber above the predetermined level of the steeping water.

4. An installation according to claim 1, including a lid rotatable in a water-channel seal about the centre of the box to maintain the air-tight sealing of the chamber.

5. An installation according to claim 4, where the means for turning the material comprises a vertically movable oar mounted on said lid, said lid additionally having a trunk which is movable both vertically and horizontally to traverse the width of the chamber and is connected with a suction-compression unit through a connection communicating with a conduit rotatable about the centre of the chamber.

6. An installation according to claim 4, including a plurality of winches arranged on the lid along the inner circumference of the annular chamber at equal distances from each other, and the floor of the chamber having a cleaning aperture so that when the floor is raised by the winches it is rotatable with the lid, and water jets are provided for insertion radially through the outer chamber wall and further water jets are provided for insertion through the lid and the cleaning aperture.

7. An installation according to claim 1, wherein the space in the chamber above the steeping-water level communicates through air-outlets of the outer chamber wall with an air-exhaust duct and through other apertures with the suction end of the means for supplying conditioned air, which latter connects on the delivery end with the outlet of the conduit means.

8. An installation according to claim 1, including an axial fan arranged in the centre of the annular chamber to connect directly on the delivery side with the outlet of the conduit means and equipped with moistening nozzles and means for cooling and/or heating air are provided between the suction-side of the axial fan and apertures in the inner wall of the annular chamber.

References Cited
UNITED STATES PATENTS 1,090,431   3/1914   Topf _____ 195—129

A. LOUIS MONACELL, Primary Examiner

W. A. SIMONS, Assistant Examiner

U.S. Cl. X.R.

99—53; 195, 128, 130